(12) United States Patent
Kuehl et al.

(10) Patent No.: US 7,980,093 B2
(45) Date of Patent: Jul. 19, 2011

(54) COMBINED REFRIGERANT COMPRESSOR AND SECONDARY LIQUID COOLANT PUMP

(75) Inventors: Steven J. Kuehl, Stevensville, MI (US); Guolian Wu, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 12/567,019

(22) Filed: Sep. 25, 2009

(65) Prior Publication Data

US 2011/0072849 A1 Mar. 31, 2011

(51) Int. Cl.
  *F25D 17/02* (2006.01)
(52) U.S. Cl. ........................................... 62/435; 62/467
(58) Field of Classification Search .................. 62/435, 62/467, 498, 185, 331, 332, 333, DIG. 2; 417/38, 364, 372
See application file for complete search history.

(56) References Cited

U.S. PATENT DOCUMENTS

| | | | |
|---|---|---|---|
| 2,935,023 A | | 5/1960 | Jackson et al. |
| 4,406,138 A * | | 9/1983 | Nelson ............................. 62/305 |
| 4,423,602 A * | | 1/1984 | Venable ......................... 62/238.6 |
| 4,512,728 A | | 4/1985 | Nakano et al. |
| 4,603,489 A * | | 8/1986 | Goldberg .......................... 34/77 |
| 4,984,435 A * | | 1/1991 | Seino et al. ...................... 62/434 |
| 5,214,932 A * | | 6/1993 | Abdelmalek ................. 62/238.4 |
| 5,355,691 A * | | 10/1994 | Sullivan et al. ................. 62/201 |
| 5,626,025 A * | | 5/1997 | Hyde ............................... 62/117 |
| 5,647,225 A * | | 7/1997 | Fischer et al. .................. 62/434 |
| 6,098,422 A | | 8/2000 | Tischer |
| 6,250,102 B1 | | 6/2001 | Tischer |
| 6,564,560 B2 * | | 5/2003 | Butterworth et al. ............. 62/84 |
| 6,584,784 B2 * | | 7/2003 | Gaul ............................... 62/113 |
| 7,162,878 B2 * | | 1/2007 | Narayanamurthy et al. ..... 62/59 |
| 2001/0029747 A1 * | | 10/2001 | Gaul ............................... 62/498 |
| 2005/0247072 A1 * | | 11/2005 | Narayanamurthy et al. ... 62/222 |
| 2006/0107681 A1 * | | 5/2006 | Uno et al. ..................... 62/323.1 |
| 2006/0213218 A1 * | | 9/2006 | Uno et al. ........................ 62/467 |
| 2006/0254309 A1 * | | 11/2006 | Takeuchi et al. ................ 62/501 |
| 2007/0175212 A1 * | | 8/2007 | Uno et al. ........................ 60/519 |
| 2008/0170957 A1 | | 7/2008 | Hwang et al. |
| 2008/0184706 A1 * | | 8/2008 | Uno et al. ........................ 60/667 |
| 2008/0209941 A1 * | | 9/2008 | Narayanamurthy ............ 62/502 |
| 2008/0302113 A1 * | | 12/2008 | Yin et al. ......................... 62/115 |
| 2009/0183518 A1 * | | 7/2009 | Narayanamurthy et al. ... 62/119 |
| 2009/0293525 A1 * | | 12/2009 | Monforte ........................ 62/244 |

* cited by examiner

*Primary Examiner* — Mohammad Ali
(74) *Attorney, Agent, or Firm* — John W. Morrison

(57) ABSTRACT

A compressor for a refrigerant is integrally contained in a housing with a positive displacement pump for a secondary coolant. Both the compressor and pump are driven by a common motor. In one embodiment, a linear compressor includes a reciprocating piston rod coupled at one end to a refrigerant compressor and at an opposite end to a positive displacement liquid pump. The pump circulates a secondary coolant through a thermal storage unit and heat exchanger associated with an evaporator. The evaporator is coupled to a condenser, in turn, coupled to the compressor. A conventional rotary compressor may also have a positive displacement pump coupled to the motor to provide circulation for a secondary coolant circuit.

18 Claims, 4 Drawing Sheets

COMBINED REFRIGERANT COMPRESSOR AND SECONDARY LIQUID COOLANT PUMP

BACKGROUND OF THE INVENTION

The present invention relates to a combined compressor and liquid pump. The integral unit can be employed in a refrigerator including a freezer compartment and fresh food refrigeration compartment where the compressor performs its normal task. The pump can circulate a secondary coolant in a thermal storage system for maximizing the efficiency of operation of the refrigerator, for better food preservation, and for specialty cooling, such as zero degree compartment and ice making through a secondary coolant.

SUMMARY OF THE INVENTION

The present invention combines a compressor for a refrigerant and a pump for a secondary coolant loop for use with a refrigerator or a satellite device requiring cooling. The unit includes a housing for a refrigerant compressor and a liquid pump. The unit can be installed in a refrigerator by coupling the compressor to a condenser which, in turn, is coupled to one or more evaporators. A secondary cooling loop includes a heat exchanger in thermal communication with an evaporator, and the pump is coupled in said secondary cooling loop for circulating a liquid thermal mass to the heat exchanger The system of the present invention, therefore, provides an integral compressor and pump for circulating cooled heat transfer liquid from a thermal storage unit in at least one of several possible circuits. One circuit includes a heat exchanger coupled to the fresh food evaporator for either assisting in cooling the fresh food section of the refrigerator, for cooling the heat transfer liquid, or defrosting the fresh food evaporator. Another circuit includes an intercooler for the condenser for cooling the refrigerant output from the condenser to below ambient temperatures before entering the expansion device, thereby increasing the instantaneous efficiency and cooling capacity of the system. Another circuit includes a satellite device requiring cooling.

In a preferred embodiment of the invention, a linear compressor includes a reciprocating piston rod coupled at one end to a refrigerant compressor and at an opposite end to a positive displacement liquid pump. The pump circulates a secondary coolant through a thermal storage unit and heat exchanger associated with an evaporator. The evaporator is coupled to a condenser, in turn, coupled to the compressor. A conventional rotary compressor may also have a positive displacement pump coupled to the motor to provide circulation for a secondary coolant circuit.

Thus, with the system of the present invention, the capacity available from a linear, reciprocating, scroll, or rotary compressor can be integrated with a pump to store thermal energy for use under high demand conditions and efficiently operate a refrigeration system or a satellite device.

These and other features, objects and advantages of the present invention will become apparent to those skilled in the art upon reading the following description thereof together with reference to the accompanying drawings.

DETAILED DESCRIPTION OF THE PREFERRED EMBODIMENT

Figure 1:
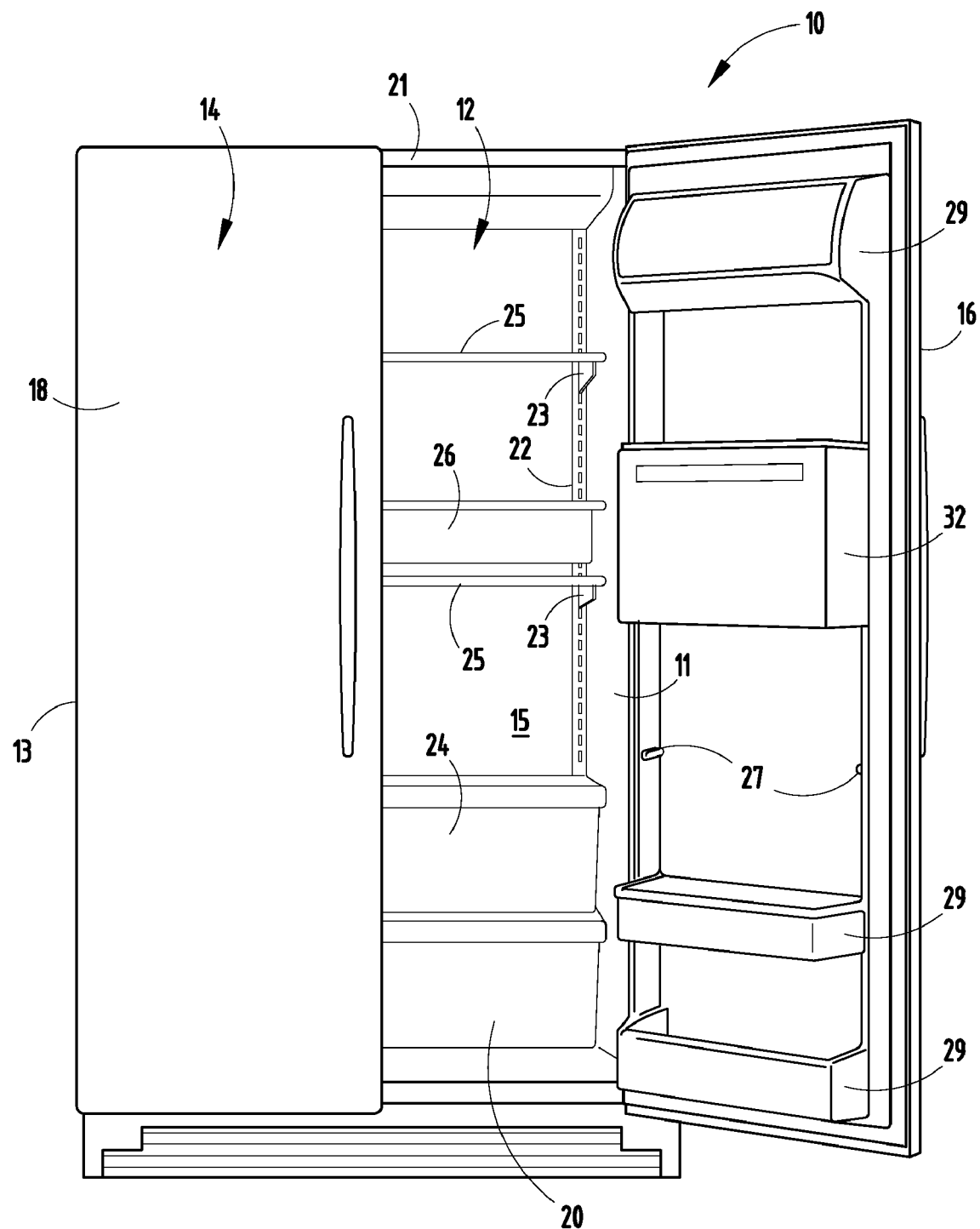
FIG. 1 is a perspective view of a side-by-side refrigerator freezer incorporating the combined compressor/pump.

Referring initially to FIG. 1, there is shown a refrigerator freezer 10 embodying the present invention, which includes a side-by-side refrigerated cabinet 12 and a freezer cabinet 14. Each of the cabinets 12 and 14 include side walls 11 and 13, respectively, and a rear wall 15. Refrigerator 10 also includes a closure door 16 for the refrigerator cabinet 12 which is hinged to cabinet 12 and a freezer door 18 hinged to the freezer cabinet 14. Both doors 16 and 18 include suitable seals for providing an airtight thermally insulated sealed connection between the doors and respective cabinets. Although a side-by-side refrigerator/freezer is illustrated in FIG. 1, the present invention can be employed with any configuration of a refrigerator/freezer combination.

Refrigerator 10 is adapted to receive a variety of shelves and modules at different positions defined by, in the embodiment shown in FIG. 1, a plurality of horizontally spaced vertical rails 22 extending from the rear wall of the refrigerator and freezer compartments. In the embodiment shown, the supports are in the form of vertically extending rails with vertically spaced slots for receiving mounting tabs on shelf supports 23 and similar tabs on modules, such as modules 20, 24, 25, and 26, for attaching them in cantilevered fashion to the cabinets at selected incrementally located positions. The inside edges of doors 16 and 18 also include vertically spaced shelf supports, such as 27, for positioning bins 29 and modules, such as 32, in the doors. The shelves, modules, and bins and, thus, be located at a variety of selected locations within the cabinets 12 and 14 and doors 16 and 18 to allow the consumer to select different locations for convenience of use.

Some of the modules in refrigerator 10, such as module 20, may require operating utilities. Thus, module 20 may be a powered crisper or an instant thaw or chill module and may require utilities, such as cooled or heated fluids or electrical operating power. Other modules, such as module 26, may likewise require operational utilities while modules, such as a passive crisper module 20, would not. Door modules also, such as module 32, may, for example, include a water dispenser, vacuum bag sealer or other accessory conveniently accessible either from the outside of door 16 or from within the door and likewise may receive operating utilities from conduits, such as disclosed in application Ser. Nos. 12/469, 915, filed May 21, 2009, entitled REFRIGERATOR MODULE MOUNTING SYSTEM; 12/469,968 filed May 21, 2009, entitled MULTIPLE UTILITY RIBBON CABLE; and 12/493,524 filed Jun. 29, 2009, entitled TUBULAR CONDUIT. The disclosures of these patent applications are incorporated herein by reference.

Contained within the insulated cabinets of the refrigerator are the usual freezer and fresh food evaporator, condenser, and the usual fluid couplings to a compressor for the operation of the refrigerator. Refrigerator 10 of this invention, however, includes the compressor/pump unit of this invention, additional fluid circuits, and a thermal storage system as shown in the schematic diagram of FIG. 2, now described.

Figure 2:
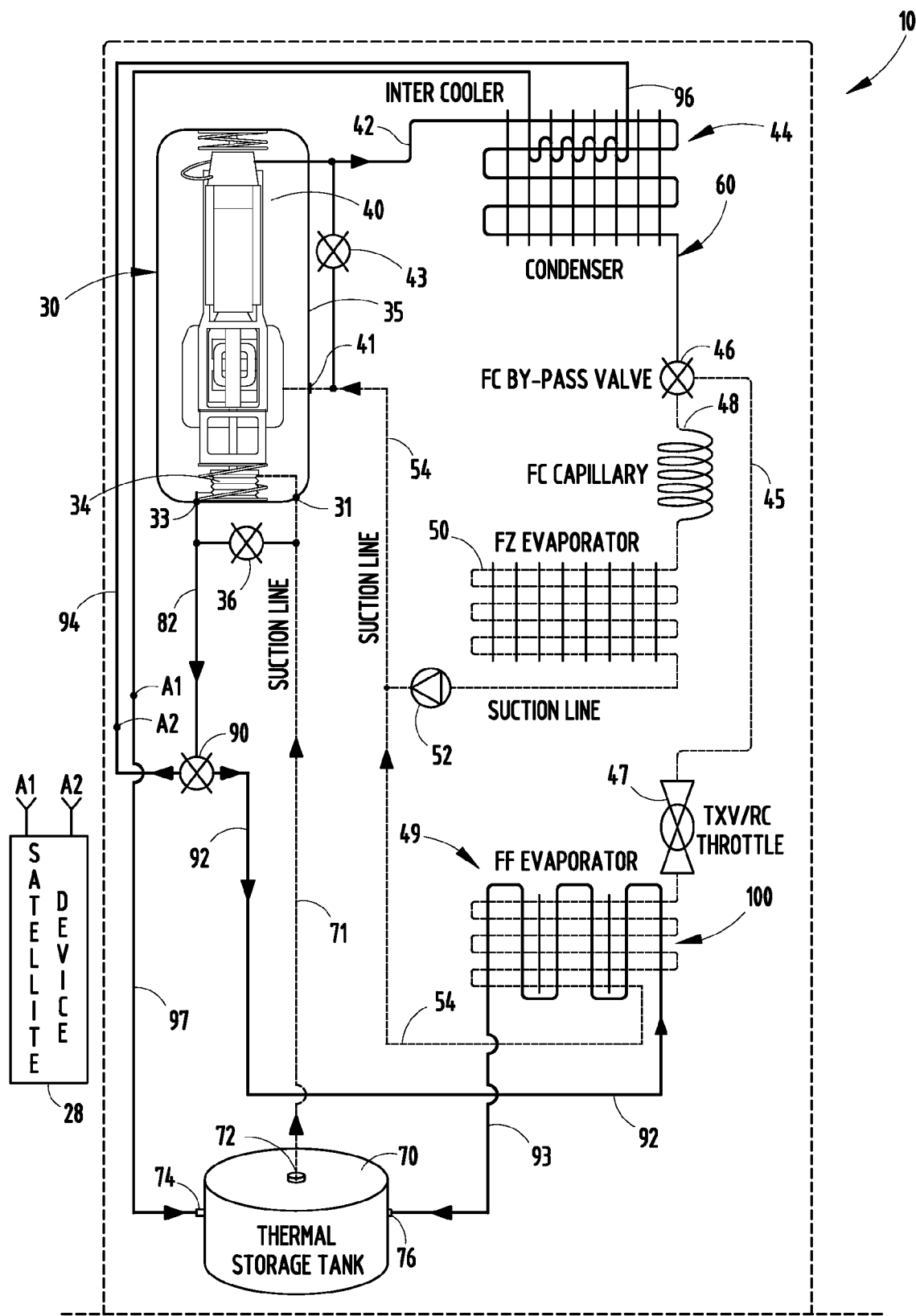
FIG. 2 is a schematic view of the components of the system of the present invention including a preferred embodiment of the compressor/pump.

The schematic diagram of FIG. 2 shows the locations of various major components of the refrigerator and thermal storage system in no particular relationship within the refrigerator cabinet, it being understood that, in practice, these elements can be located in any conventional or convenient location. For example, the condenser may conventionally be located in the back outside wall of the cabinet or in a compartment above cabinets 12, 14. Thus, the schematic diagram of FIG. 2 is illustrative only and does not necessarily limit the position of any of the components.

In FIG. 2, refrigerator 10 includes a sealed compressor/pump unit 30, which integrally includes a linear compressor 40 and a positive displacement liquid pump 34. Due to its relatively flat elongated shape, unit 30 can be located conveniently at nearly any location within the refrigerator, including in the space between the refrigerator inner liner and its outer shell. Frequently, a compressor is located near the top of the refrigerator near the condenser where heat can be evacuated upwardly and away from the refrigerator cabinet. The compressor 40 can be of the type described in U.S. patent application Ser. No. 10/553,944 filed Apr. 22, 2004, entitled SYSTEM FOR ADJUSTING RESONANT FREQUENCIES IN A LINEAR COMPRESSOR and published as Publication No. 2006/0110259 on May 25, 2006, which is modified, as described below in conjunction with the FIG. 3 description, to include within the sealed unit the pump 34. The disclosure of this application and publication are incorporated herein by reference.

Compressor 40 is coupled to a refrigeration circuit 60 including outlet/conduit 42 which couples the compressor to a condenser 44 and then to a two-way bypass valve 46. The bypass valve 46 is selectively operated to either direct the refrigerant flow through a freezer compartment capillary 48 and into the freezer compartment evaporator 50 or via conduit 45 to the fresh food evaporator 49 through a thermostatic expansion valve 47 or other expansion device. When in a position to direct refrigerant to the freezer evaporator 50, a check valve 52 is open to the suction line 54 leading to the input 41 of the compressor. With the valve 46 in the freezer compartment bypass position, the refrigerant flows through conduit 45 into a thermostatic expansion valve 47, into the fresh food evaporator 49, and then into the suction line 54 again leading to the input 41 of compressor 40. Bypass valve 46 is selectively operated by a microprocessor-based control circuit to either allow the flow of refrigerant through the freezer evaporator 50 or, alternatively, through the fresh food evaporator 49 depending upon the thermal demand of the compartments 14, 12, respectively. Though not illustrated thusly, suction line 54 typically is in thermal communication with freezer capillary 48 or fresh food expansion device 47 for operational efficiency. The components of the refrigeration system described thus far are typical components in a normal refrigeration system in which a microprocessor-based control circuit with suitable temperature sensors is employed and can be of a generally conventional design.

In addition to the coolant circuit for the freezer evaporator 50 and the fresh food evaporator 49 described, the system of the present invention adds parallel flow paths or first and second coolant circuits for circulating a chilled liquid from a thermal storage tank 70. Tank 70 is a thermally insulated tank and can be placed in the fresh food compartment or otherwise located in the machine compartment section of a given refrigerator/freezer configuration. Tank 70 typically is blow molded of a suitable polymeric material, such as PVC or polyethylene, and insulated by a jacket. It could be a Dewar flask or thermos vacuum bottle type tank using metal plated polymers as chrome plates onto ABS and other polymers very well to provide a highly reflective surface. The size of tank 70 depends on the intended application. If the stored thermal mass is strictly for a single refrigerator, then it may have a capacity of 1 to 4 liters for holding approximately 0.75 to 3 kgs of, for example, a water/alcohol solution. If a secondary circuit for supplemental satellite devices, such as counter top devices 28 or the like, are coupled to refrigerator 10, tank 70 could be two to three times larger. The tank includes an output connection 72 and two input connections 74 and 76 for circulating stored liquid coolant through two separate circuits either to chill the coolant or to transfer heat from the refrigerator components to the chilled coolant.

Output connection 72 is coupled by conduit 71 to the input 31 of liquid pump 34 having an output 33 coupled to a three-way valve 90. Valve 90 has three positions which can direct fluid from output 33 of pump 34 to a first conduit 92, a second conduit 94, or to both conduits simultaneously depending upon the position of the three-way valve 90. In one position, only conduit 92 is coupled to the output of pump 34 and couples the chilled fluid from tank 70 to a first circuit including a secondary heat exchanger 100 in thermal communication with fresh food evaporator 49. The secondary heat exchanger is coupled by a return conduit 93 to input 76 of thermal storage tank 70 to complete the first circulation circuit.

A second circulation circuit includes conduit 94 coupled to valve 90 and coupled to an intercooler 96 integrated with condenser 44 to cool the typically warm refrigerant liquid in the condenser before it enters an expansion device. A return conduit 97 from intercooler 96 leads back to the input 74 of thermal storage tank 70. In a third position of valve 90, the chilled coolant in thermal storage tank 70 is simultaneously circulated through both the first circulation circuit including the secondary heat exchanger 100 and the second circulation circuit including the intercooler 96. An additional coolant loop, including an external satellite device such as a counter top chiller 28, can be coupled to conduits 94 and 97 as indicated by connectors A1 and A2 in FIG. 2 to provide the coolant from tank 70 to device 28. A valve (not shown) may be selectively controlled to discontinue or limit the flow of coolant in conduit 94 to the intercooler 96 when device 28 is calling for cooling.

The coolant employed for the thermal storage tank 70 and circulated by pump 34 can be one of a number of conventional coolants employed in the refrigeration industry, such as water, a water/alcohol mixture, brine, or a Dynalene® heat transfer fluid. The thermal storage tank, once filled through a suitable opening which is subsequently sealed after the circulation circuits through the intercooler 96 and secondary heat exchanger 100 have been purged of air, provides sealed liquid circuits or loops for the chilled thermal medium being pumped by pump 34.

The coolant in the thermal storage tank is chilled by the secondary heat exchanger 100 when the compressor 40 is in operation to provide cooling to the fresh food evaporator 49 under conditions where excess capacity from the compressor is available. Thus, when valve 46 is moved to a position to supply refrigerant through line 45 and throttle valve 47 to the fresh food evaporator 49 (unless under a high load condition for the refrigeration cabinet 12), the excess cooling available is employed by heat exchanger 100 to chill the thermal media circulated by pump 34 through the first circulation circuit, including conduit 71, pump inlet 31, valve 90, conduit 92, heat exchanger 100, and conduit 93, back to tank 70 to chill the liquid coolant. The overall operation of the system during different modes of operation is described in detail in U.S. patent application Ser. No. 12/503,325 filed Jul. 15, 2009, entitled HIGH EFFICIENCY REFRIGERATOR, the disclosure of which is incorporated herein by reference.

Figure 3:
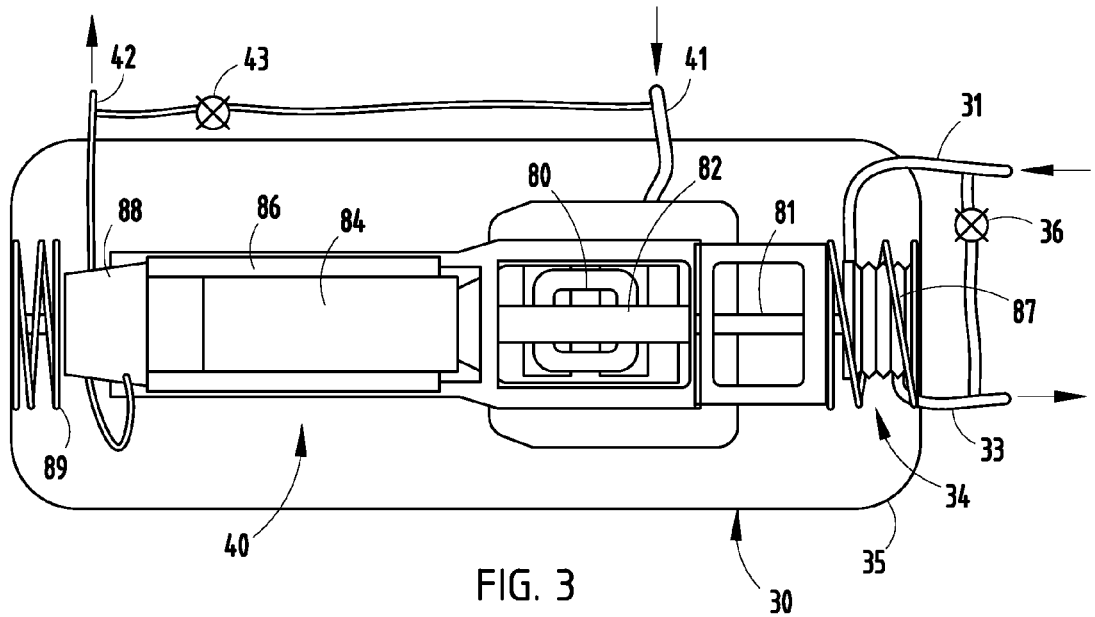
FIG. 3 is an enlarged view of the compressor/pump comprising a linear compressor and liquid pump shown in FIG. 2.

Referring now to FIG. 3, the compressor/pump unit 30 includes a sealed outer housing 35, which houses the linear compressor 40 and integrated liquid pump 34. Compressor 40 includes a linear motor 80 which drives a piston rod 82 in a linear fashion to the left and right, as seen in FIG. 3. One end of rod 82 is coupled to a piston 84 in a cylinder 86 for compressing refrigerant from input 41 through head 88 and discharging the compressed refrigerant through outlet 42. At the end of head 88 is a compression spring 89 which controls the stroke of the piston and its movement within the sealed housing 35. At the opposite end of piston rod 82, a secondary rod 81 is coupled to a bellows or diaphragm-type positive displacement pump 34 surrounded by a compression spring 87, such that the entire mechanism, including piston rods 82, 81 and piston 84 and associated cylinder 86, and motor 80, can float within the sealed housing 35.

The compressor 40 includes a hot gas bypass proportional valve 43 coupled between the input 41 and output 42 of compressor 40 to modulate the capacity of the compressor 40 as desired during different operational conditions. Similarly, the liquid pump 34 includes a liquid bypass proportional valve 36 between input 31 and output 33 to modulate the capacity of the liquid coolant from pump 34 to the various circuits being served by the secondary coolant. Pump 34 may take on a variety of other forms, such as shown in FIGS. 4-8 now described.

Figure 4:
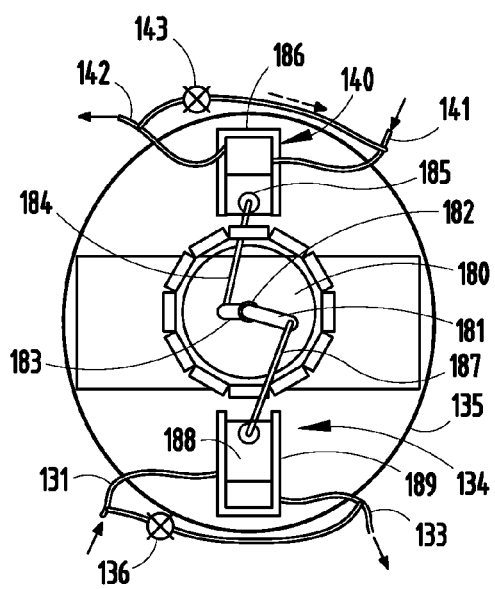
FIG. 4 is a side schematic view of an integral refrigerant compressor and reciprocating liquid pump.

In FIG. 4, both the compressor 40 and pump 34 are replaced with a conventional rotary compressor 140 in a sealed container 135 driven by a rotary motor 180 having a drive shaft 182 and a first crank arm 183 coupled to a connecting piston rod 184, in turn, coupled to piston 185 in compressor cylinder 186. An input 141 for compressor 140 supplies the return refrigerant to the cylinder 186, which is compressed by piston 185 and discharged through outlet 142. Again, a proportional bypass valve 143 coupled between inlet 141 and outlet 142 of the compressor 140 to modulate the capacity of compressor 140. Pump 134 likewise is coupled to motor 180 through a second crank arm 181 and connecting rod 187 to piston 188 in cylinder 189. Suitable conventional valves are provided in both cylinders 186 and 189 to allow the inflow of either refrigerant or coolant through inlets 141 and 131 to outlets 142 and 133, respectively. In order to control the capacity of the liquid pump 134, a proportional control bypass valve 136 is coupled between the inlet 131 and outlet 133.

Figure 5:
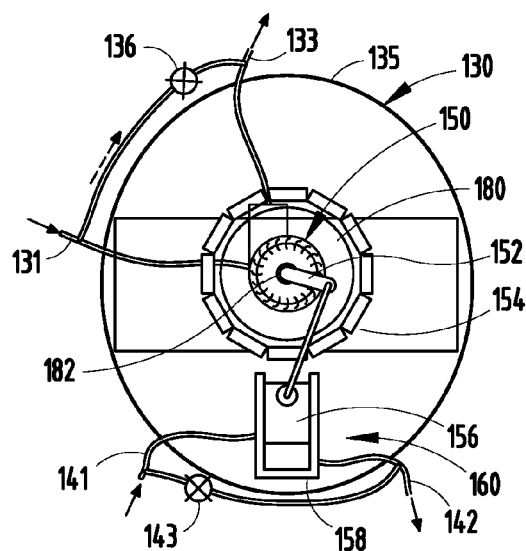
FIG. 5 is a side schematic view of an integral refrigerant compressor and centrifugal liquid pump.

In FIG. 5, a motor, such as motor 180, is also employed, however, pump 134 is replaced with a centrifugal pump 150 driven by shaft 182 of motor 180. Shaft 182 of motor 180 is also coupled to a crank arm 152 and connecting rod 154 to a compressor piston 156 of a refrigerant compressor 160 having a cylinder 158 for receiving refrigerant from input 141 and compressing the refrigerant, which exits output 142 of the compressor/pump unit 130. Compressor 160 and pump 150 are sealed in a housing 135 as in the previous embodiments. Proportional bypass valve 136 is coupled between the inlet 131 and outlet 133 of the centrifugal pump 150, while a similar proportional control bypass valve 143 is coupled between inlet 141 and outlet 142 of the compressor 160 to modulate the respective capacities.

Figure 6:
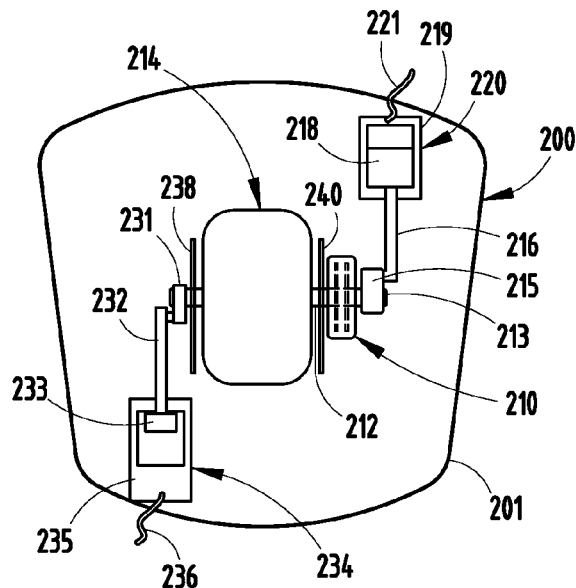
FIG. 6 is an end schematic view of an integral compressor/pump, such as shown in FIG. 4, shown with a magnetic clutch to control the liquid pump.

FIG. 6 illustrates an alternate manner by which the capacity of the liquid pump 200 can be controlled through the use of a magnetic clutch 210 coupled to the motor shaft 212 of drive motor 214. Shaft 213 is coupled from the output of clutch 210 to a crank arm 215 coupled to a piston rod 216 coupled to piston 218 in cylinder 219. Magnetic clutch 210 can be controlled to selectively control the operation of the positive displacement pump 220 to control its capacity as desired for a given application. Pump 220 has an input (not shown) and an output 221. The pump 220 integrated within the sealed housing 201 of compressor/pump unit 200 includes conventional valves, as does compressor 234. Piston 233 of compressor 234 is coupled to motor shaft 212 by a crank arm 231 and connecting rod 232. Piston 233 compresses refrigerant within cylinder 235, which is coupled to an inlet (not shown) and an outlet 236. A proportional control valve extends between the inlet (not shown) and outlet 236 to modulate the capacity of the compressor. The compressor/pump are supported within sealed housing 201 by suitable frame members 238 and 240, which include bearings for rotatably supporting drive shaft 212 of motor 214.

Figure 7:
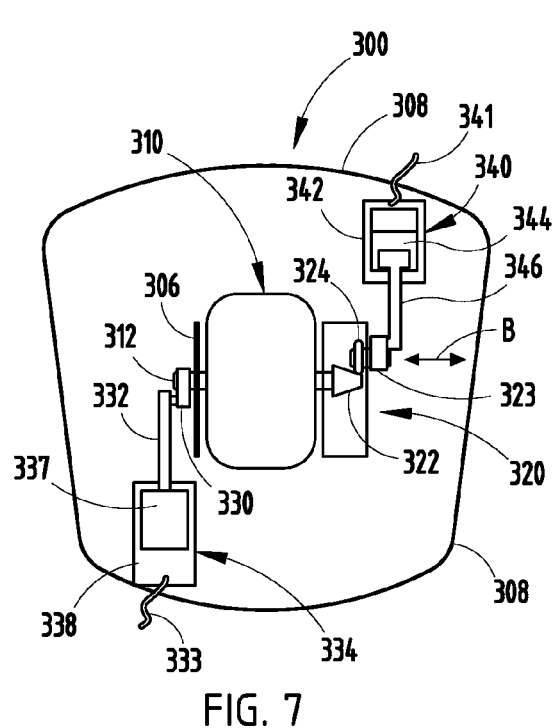
FIG. 7 is an end view of an integral compressor and positive displacement pump having a variable speed transmission for controlling the operation of the liquid pump.
Figure 8:
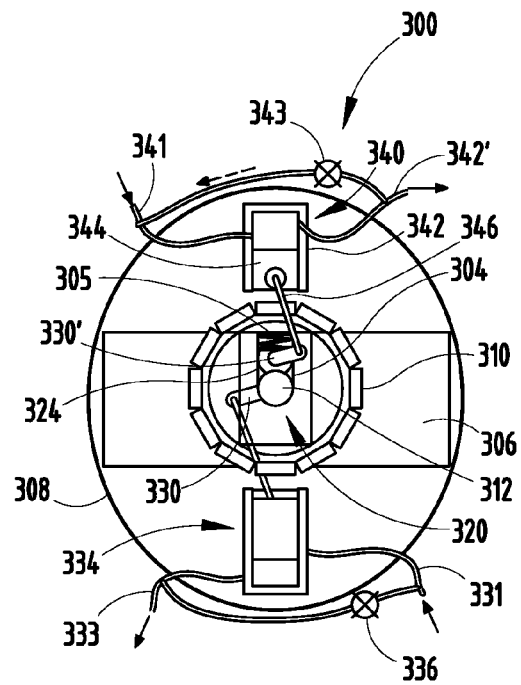
FIG. 8 is a side schematic view of the compressor/pump shown in FIG. 7.

FIGS. 7 and 8 illustrate another manner by which an integrated compressor and liquid pump can be controlled to vary the capacity of either the secondary coolant pump or the compressor. In FIGS. 7 and 8, an integrated compressor/pump unit 300 is illustrated which includes a rotary motor 310 having a rotary shaft 312 extending from opposite sides thereof. The motor and other components are housed within a sealed housing 308. A support frame 306 is coupled to housing 308 and supports the motor 310. Shaft 312 is coupled by a variable speed transmission 320 including a conical drive cone 322 and rotor wheel 324 engaging drive cone 322 at movable locations, indicated by arrow B in FIG. 7, to vary the speed of the coupling of shaft 312 to the crank arm 330' of pump 340, which includes a cylinder 342, a piston 344, and a connecting rod 346 coupled to solenoid 323 to provide a variable speed drive for pump 340. The drive shaft 312 of motor 310 is also coupled by a second crank arm 330 to a connecting rod 332 coupled to a piston 337 of compressor 334. Piston 337 is mounted within a cylinder 338, including suitable conventional valving for providing a flow of refrigerant through compressor 334 through the outlet 333 thereof from an inlet 331 (FIG. 8). The flow of liquid through compressor 334 can be controlled by a proportional bypass valve 336 coupled between inlet 331 and outlet 333, as illustrated in FIG. 8, while the variable speed transmission 320 is employed to control the speed and, therefore, the output of pump 340. To provide additional control, a proportional bypass valve 343 may be coupled between the input 341 and output 342' of the pump 340, as illustrated in FIG. 8.

Thus, with the variable speed output shaft for driving pump 340 together with proportional bypass valve 343, significant control of the amount of secondary coolant can be provided. In some cases, proportional valves 343 need not be employed and the variable speed transmission 320 provides sufficient desired control. In order to allow the drive shaft 312 of motor 310 to track the movement of wheel 324 and drive cone 322. The frame 306 includes a slot 304 (FIG. 8) and bias spring 305 to allow the drive shaft 312 to float with the movement of the wheel 324. The wheel is moved in the direction indicated by arrow B by an electrically control solenoid 323 coupled between the wheel 324 and the piston rod 346 utilizing suitable bearings for such purpose. In some installations, the drives for the liquid pump and the compressor can be reversed to provide a variable speed or selectable drive to either one of the members. Also, it may be desirable to use a magnetic clutch or variable speed transmission on both the pump and the compressor sides of the drive motor.

In each of the embodiments shown in FIGS. 2-8, a compressor/pump is sealably enclosed in a housing and includes inlets and outlets for both the refrigerant and the secondary liquid coolant in an integrated single piece unit which can be conveniently mounted in a refrigerator, such as refrigerator 10 shown in FIG. 1.

Thus, in the various modes of operation, the excess thermal capacity of a compressor is employed for storing thermal energy in the form of cooling the liquid coolant in thermal storage tank 70, which can be subsequently used in either the first circulation circuit for either cooling to the liquid cooling medium when the refrigerant from compressor 40 is being applied to the fresh food evaporator 49 or for providing cooling to the fresh food compartment when the bypass valve 46 is in the freezer position. Alternately, when there is no need for coolant in the liquid storage tank to be additionally cooled, it can be employed for inter-cooling the condenser 44, thereby increasing the efficiency and capacity of the system in operation. Also, the secondary coolant can be supplied to external supported thermal load 28 (FIG. 2) or for other satellite loads as described in application Ser. No. 11/770,033 filed Jun. 28, 2007, and entitled REFRIGERATION APPLIANCE WITH OPTIONAL STORAGE MODULE, the disclosure of which is incorporated herein by reference Thus, with the system of the present invention, the capacity available from the compressor and, particularly, as in the preferred embodiment, a linear compressor with greater capacity and flexibility is employed, can be used to more efficiently operate the refrigeration system and even out the demand on both the compressor and other refrigeration components.

It will become apparent to those skilled in the art that various modifications to the preferred embodiments of the invention as described herein can be made without departing from the spirit or scope of the invention as defined by the appended claims.

The invention claimed is:

1. A combined compressor for a refrigerant and a pump for a secondary coolant loop for use with a refrigerator comprising:
   a motor commonly coupled to a compressor for a refrigerant and a pump;
   a condenser coupled to an output of said compressor;
   an evaporator coupled to said condenser;
   a secondary cooling loop including a heat exchanger in thermal communication with said evaporator, wherein said pump is coupled in said secondary cooling loop for circulating a liquid thermal mass to said heat exchanger; and
   a control coupled to said compressor and to said pump for selectively bypassing the fluid flow in said compressor and said pump.

2. The combined compressor and pump as defined in claim 1 wherein said secondary coolant loop includes a second heat exchanger spaced from said evaporator for providing cooling to an area of the refrigerator remote from said evaporator.

3. The combined compressor and pump as defined in claim 2 and further including a container in said secondary coolant loop for storing said liquid thermal mass.

4. The combined compressor and pump as defined in claim 3 wherein said liquid thermal mass is one of water, a water alcohol mixture, brine, and a Dynalene® heat transfer fluid.

5. The combined compressor and pump as defined in claim 4 wherein said second heat exchanger is positioned in thermal communication with said condenser.

6. The combined compressor and pump as defined in claim 4 wherein said heat exchanger is positioned in a fresh food compartment of a refrigerator in thermal communication with said evaporator.

7. The combined compressor and pump as defined in claim 1 wherein said motor is a linear motor.

8. The combined compressor and pump as defined in claim 7 wherein said linear motor has a reciprocating piston which is coupled to a gas pump for a refrigerant on one side of said piston and to a liquid pump on an opposite side of said piston.

9. The combined compressor and pump as defined in claim 1 wherein said motor is a rotary motor having a shaft coupled to a gas pump for a refrigerant and to a liquid pump.

10. A combined compressor and pump comprising:
    a motor having a rotary shaft;
    a refrigerant compressor coupled to said shaft;
    a pump coupled to said shaft; and
    a control coupled to said compressor and to said pump for selectively bypassing the fluid flow in said compressor and said pump.

11. The combined compressor and pump as defined in claim 10 wherein said compressor has an input and an output and said pump has an input and an output and wherein said control comprises a selectively controlled bypass valve coupled between said input and said output of each of said compressor and said pump.

12. The combined compressor and pump as defined in claim 10 wherein said control comprises a clutch coupled between said shaft and at least one of said compressor and said pump for selectively driving at least one of said compressor and said pump.

13. A combined compressor and pump comprising:
    a motor having a linearly movable shaft;
    a refrigerant compressor coupled to one end of said shaft;
    a pump coupled to an opposite end of said shaft; and
    a control coupled to said compressor and to said pump for selectively bypassing the fluid flow in said compressor and said pump.

14. The combined compressor and pump as defined in claim 13 wherein said compressor has an input and an output and said pump has an input and an output and wherein said control comprises a selectively controlled bypass valve coupled between said input and said output of each of said compressor and said pump.

15. The combined compressor and pump as defined in claim 14 and further including a housing sealably enclosing said compressor to define a linear compressor.

16. A refrigerator having a fresh food compartment, said refrigerator including a combined compressor and pump for a secondary coolant circuit used for supplemental cooling of the fresh food compartment or a satellite accessory requiring a coolant, said refrigerator comprising:
    a fresh food compartment;
    a motor commonly coupled to a compressor for a refrigerant and a pump for a secondary coolant;
    a condenser coupled to an output of said compressor;
    an evaporator coupled to said condenser and positioned in said fresh food compartment;
    a secondary cooling circuit including a heat exchanger in thermal communication with said evaporator, wherein said pump is coupled in said secondary cooling circuit for circulating a liquid thermal mass to said heat exchanger;
    a storage tank in said secondary cooling circuit for storing a liquid coolant; and
    a control coupled to said compressor and to said pump for selectively bypassing the fluid flow in said compressor and said pump.

17. The refrigerator as defined in claim 16 wherein said compressor has an input and an output and said pump has an input and an output and wherein said control comprises a selectively controlled bypass valve coupled between said input and said output of each of said compressor and said pump.

18. The refrigerator as defined in claim 16 wherein said motor is a rotary motor having an output shaft and said control comprises a clutch coupled between said shaft and at least one of said compressor and said pump for selectively driving at least one of said compressor and said pump.

* * * * *